United States Patent Office 3,119,855
Patented Jan. 28, 1964

3,119,855
ORGANO FUNCTIONAL CYCLOSILOXANE POLYMERS
Donald L. Bailey, Snyder, Victor B. Jex, Clarence, and William T. Black, White Plains, N.Y., assignors to Union Carbide Corporation, a corporation of New York
No Drawing. Continuation of application Ser. No. 615,499, Oct. 12, 1956. This application July 19, 1960, Ser. No. 43,745
7 Claims. (Cl. 260—448.2)

This invention relates, in general, to the synthesis of novel organosilicon compounds. More particularly, the invention contemplates the provision of novel organosiloxanes in the form of carboxypolymethylene- and carboalkoxypolymethylene-functional cyclosiloxane polymers, novel compositions of matter consisting essentially of isomeric mixtures of such cyclosiloxane polymers, and novel alkali metal and acyl chloride derivatives of such cyclic polymers. Specifically, the invention is directed to the group of relatively short-chain, well-defined, low molecular weight compounds consisting of the carboxy- and carboalkoxypolymethylene-alkyl and arylsiloxane cyclic trimers, tetramers and pentamers, and cyclic alkali metal and acyl chloride derivatives thereof, as represented in general by the following formulae:

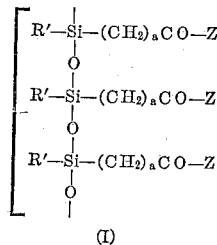

(I)

and

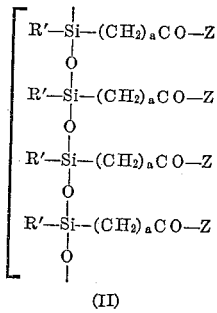

(II)

and

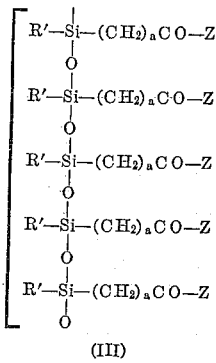

(III)

wherein, in all three chain-isomers, Z represents a member selected from the group consisting of the alkali metaloxy radicals (MO—) from alkali metal hydroxides, chlorine, and hydroxy, alkoxy and aryloxy radicals; R' represents a monovalent hydrocarbon radical, including both alkyl and aryl radicals; and ($a$) is any integer from 3 to 10 inclusive.

Heretofore, a number of organosilicon compounds containing silicon-substituted carboxylated radicals have been prepared by reacting unsaturated aliphatic or cyclic monoesters and diesters with silanes containing at least one silanic hydrogen bond, to provide a carboxylated silane which is then hydrolyzed to produce a corresponding siloxane. For the most part, the polysiloxanes obtained in this manner consist of relatively poorly-defined, high molecular weight linear polymers of uncertain chain-length which are not well suited for use in controlled silicone equilibration techniques wherein the incorporation of a fixed percentage of organo functional groups into high molecular weight siloxanes is desired. Rather, in lieu of crude cohydrolyzates obtained by catalytic copolymerizations employing such linear polysiloxanes as starting materials, a great many industrial applications require the use of an individual well-defined, low molecular weight pure siloxane as a starting material, and the novel cyclic polysiloxanes of the present invention are ideally suited for this purpose, serving as selective sources of organofunctional carboxy and carboalkoxy groups when employed either individually in pure form, or in the form of their pure chain-isomeric mixtures as, for example, within gum stock compositions which require absolutely pure compounds.

The novel compounds of the invention can be produced by a number of different syntheses. Thus, in our copending application Serial No. 615,492, filed October 12, 1956, we have described and claimed a unique process for the production, in general, of silicon compounds containing a carboalkoxy group attached to the silicon atom or atoms through a polymethylene linkage, which involves the acid-catalyzed alcoholysis of cyanopolymethylene silicon compounds, whereby the cyano group of the cyanopolymethylene substituent is converted to the desired carboalkoxy substituent. The carboalkoxy-functional cyclic siloxanes of the present invention have been produced by neutral hydrolysis of silicon difunctional silane esters (carboalkoxy-polymethylenealkyldialkoxysilanes), which were obtained in accordance with the process of our aforementioned copending application by acid-alcoholysis of the corresponding cyanopolymethylenealkyldichlorosilanes. A cyanopolymethylene cyclic siloxane can be subjected to alkaline hydrolysis in accordance with the process described and claimed in our copending application Serial No. 615,468, also filed October 12, 1956, and the resulting hydrolyzate condensed to yield the corresponding carboxy-substituted cyclic polysiloxane, the latter compound being converted initially to the cyclic acid chloride by treatment with thionyl chloride and ultimately to the carboalkoxy-substituted polysiloxane, which may be distilled to yield carboalkoxy-functional cyclic polymers of the invention. Alternatively, the carboalkoxy-functional cyclic siloxane polymers of the invention may be synthesized by the direct acid-catalyzed alcoholysis of a cyanopolymethylene cyclic siloxane, with conversion of the cyano group to a carboalkoxy substituent in accordance with the principles and techniques of our aforementioned copending application Serial No. 615,492.

Cyclic polymers containing carboxy functional groups have been obtained in high yields by the alkaline hydrolysis of cyanopolymethylene cyclic siloxanes followed by neutralization to obtain the free acid in accordance with the process described and claimed in aforementioned copending application Serial No. 615,468. Alternatively, the carboxy-functional cyclic polysiloxanes of the invention can be produced by saponification and neutralization of a corresponding carboalkoxy-functional cyclic polymer.

Suitable cyanopolymethylene silicon compounds for use as starting materials in those syntheses are described and claimed in copending U.S. applications Serial No. 555,201, filed jointly by Victor B. Jex and J. E. McMahon on December 23, 1955, and Serial No. 555,203, filed jointly by Victor B. Jex and R. Y. Mixer, also on December 23, 1955.

The cyclic carboxy- and carboalkoxy-functional siloxanes of the invention are extremely useful as intermediates in the production of a variety of carboxy- and carboalkoxysiloxy-modified silicone and organic products. Thus, they may be copolymerized with other siloxanes of the general unit formulation:

(IV) 

wherein $a$ has a value from 1 to 3 inclusive, and $R''$ is any monovalent hydrocarbon radical; or, they may be copolymerized with other organo functional siloxanes; or reacted with polyfunctional organic compounds, either alone or when copolymerized with other siloxanes; or reacted via the organo functional groups with other organo functional siloxanes. The compounds may be employed for these purposes in pure form or in the form of their isomeric mixtures as usually obtained by the foregoing syntheses.

A typical equilibration of the general class described above is that represented by the production of carboalkoxpolymethylenealklsiloxy-modified silicone oils from the corresponding cyclopolysiloxanes with other cyclic silicones, and a suitable endblocker in the presence of acid catalysts as, for example, the equilibration of gamma-carbethoxypropylmethylsiloxane cyclic tetramer, dodecamethylpentasiloxane, dimethylsiloxane cyclic tetramer and sulfuric acid, to yield a carbethoxy-modified dimethylsilicone oil as represented by the equation:

(V)

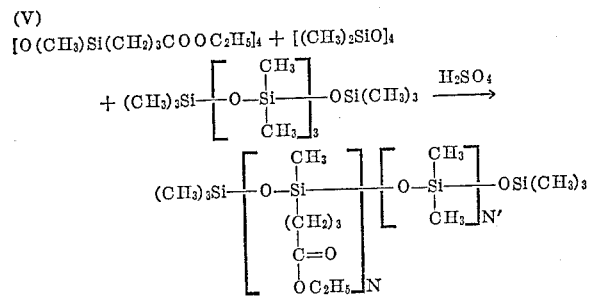

Of course, depending upon the ratio of reactants employed, one may obtain a variety of oils of varying molecular weights and percentages of carboalkoxy substituents, and oils containing phenyl, ethyl, vinyl and other groups may be prepared in a similar manner. Alternatively, in the absence of an end-blocking polymer one may prepare a variety of silicone gum stock polymers.

As pointed out hereinbefore, the carboalkoxy-functional cyclic siloxanes of the invention may be readily converted into the corresponding acid salts by saponification with base as represented in general by the following equation illustrating the aqueous alkali saponification of a typical cyclic polysiloxane of the invention, wherein R and R' represent monovalent hydrocarbon radicals, M represents an alkali metal, and $a$ is any integer from 3 to 10:

(VI)
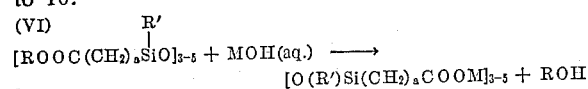

The silicone acid salts thus produced are generally water soluble materials. The free acids can be readily produced by neutralization of the polymeric alkali metal salts with any mineral acid but we prefer to employ hydrochloric acid for this purpose because of its ease of removal from the reaction system, as compared, for example, with sulfuric acid. The cyclic silicone acids prepared in this manner can be reacted with an inorganic acid chloride to produce the corresponding cyclic silicone acid chlorides which are found to undergo reactions typical of the organic acyl halides in general. We prefer to employ thionyl chloride ($SOCl_2$) as the acid chloride reagent in this reaction since the silicone acyl chlorides are thus obtained in good yields and can be purified readily. This reaction may be represented by the following skeletal equation:

(VII)

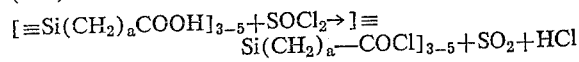

wherein $a$ has the same meaning as previously assigned above.

It is believed that the invention may be best understood by reference to the following specific examples which describe the preparation of typical isomers of the generic group of compounds of the invention in accordance with the foregoing principles and procedures, as well as typical derivatives thereof prepared by conventional silicone equilibration techniques:

PREPARATION OF CARBOALKOXYALKYLALKYLSILOXANE CYCLICS BY NEUTRAL HYDROLYSIS OF CARBOALKOXYALKYLALKYLDIALKOXYSILANES

EXAMPLE I

*Preparation of Gamma-Carbethoxypropylmethylsiloxane Cyclic Tetramer and Pentamer by Neutral Hydrolysis of Gamma-Carbethoxypropylmethyldiethoxysilane*

Gamma-carbethoxypropylmethyldiethoxysilane, obtained by acid-alcoholysis of gamma-cyanopropylmethyldichlorosilane according to the process of our copending application Serial No. 615,492, in amount 33 grams, was dissolved in 100 cubic centimeters of diethyl ether within an eight-ounce bottle. Distilled water was then added; the mixture was shaken vigorously, and left standing for seventy-two (72) hours. The ether layer was separated and dried by an azeotropic distillation using benzene as the solvent. The residue, amounting to 21.3 grams, was then stripped under vacuum and distilled through a "Hickman" molecular still at 0.3–0.4 mm. Hg, with 12.4 grams of volatile product being recovered in three (3) fractions.

Fraction I was collected from 200–230° C. and had a refractive index at 25° C. of 1.4465 indicating the cyclic tetramer. The second fraction boiling between 230–240° C. had a refractive index of 1.4500, indicating the cyclic pentamer. The yield of tetramer was 23.6 percent of theoretical based on starting materials and the total distillables were 33.3 percent. Volatiles plus non-volatiles represented 94 percent.

The following analytical and physical data were obtained for the compounds:

CYCLIC TETRAMER: ($C_{28}H_{56}O_{12}Si$)

| | Found | Theoretical |
|---|---|---|
| Carbon_____percent__ | 47.8 | 48.3 |
| Hydrogen_____do____ | 7.8 | 8.04 |
| Silicon_____do____ | 15.5 | 16.1 |
| Molecular Weight_____ | 1 614 | 696 |
| Saponification No._____ | 323 | 325 |

[1] Cryoscopic method.

CYCLIC PENTAMER: ($C_{35}H_{70}O_{15}Si_5$)

| | Found | Theoretical |
|---|---|---|
| Carbon_____percent__ | 47.7 | 48.3 |
| Hydrogen_____do____ | 8.2 | 8.04 |
| Silicon_____do____ | 16.3 | 16.1 |
| Molecular Weight_____ | 1 911 | 870 |
| Saponification No._____ | 325 | 325 |

[1] Cryoscopic method.

PREPARATION OF CARBOALKOXYALKYLALKYL-SILOXANE CYCLICS BY DIRECT HYDROLYSIS OF CYANOALKYLALKYLSILOXANE CYCLICS

EXAMPLE II

*Preparation of Gamma-Carbethoxypropylmethylsiloxane Cyclic Tetramer by Acid Alcoholysis of Gamma-Cyanopropylmethylsiloxane Cyclic Tetramer*

Gamma-cyanopropylmethylsiloxane cyclic tetramer, in amount 218 grams, was dissolved in 500 cubic centimeters of absolute ethanol within a two-liter, three-necked flask fitted with a thermometer, reflux condenser, stirrer and gas inlet tube. Hydrogen chloride was then bubbled into the solution with stirring until the solution was saturated. The solution was then heated to reflux for 76 hours with stirring during which time $NH_4Cl$ precipitated. The salt was then filtered off, and the solution again saturated with hydrogen chloride and refluxed for an additional eight (8) hours. The ethanol was then removed by a vacuum evaporation. The liquid residue was then distilled through a "Hickman" molecular still. A cut was isolated which distilled at 235–250° C. at 150 microns and had a refractive index of 1.4472.

An infrared survey of this fraction showed it to be essentially the gamma-carbethoxypropylmethylsiloxane cyclic tetramer, and the refractive index value confirmed this fact. The total yield of volatile cyclics was 52.7 percent of the crude product.

EXAMPLE III

*Preparation of Gamma-Carbethoxypropylmethylsiloxane Cyclic Trimer, Tetramer and Pentamer by Acid Alcoholysis of Gamma-Cyanopropylmethylsiloxane Cyclic Tetramer*

Gamma-cyanopropylmethylsiloxane cyclic tetramer, in amount 470 grams, was dissolved in absolute ethanol (552 grams) within a three-liter, three-necked flask fitted with a stirrer, a gas inlet tube and reflux condenser. The solution was then stirred, saturated with hydrogen chloride and heated to reflux (80° C.) for 16 hours during which time ammonium chloride precipitated. The ammonium chloride was filtered off, and the filtrate was again saturated with hydrogen chloride and refluxed an additional eight (8) hours, at which point it was again filtered to remove any ammonium chloride. The alcohol was then removed by vacuum evaporation and the residue was washed with diluent sodium bicarbonate. The siloxane was then dissolved in ether and toluene and washed with distilled water until neutral to pH paper. The solvents were then removed by vacuum evaporation. Infrared analysis of the material showed it to be high in linear gamma-carbethoxypropylmethylpolysiloxane but free of $C=ONH_2$, $C=NH$ and $C\equiv N$ bonds. The following procedure was adopted to increase the yield of cyclics.

The gamma-carbethoxypropylmethylpolysiloxane linears, in amount 350 grams, were dissolved in 500 cubic centimeters of toluene within a two-liter flask fitted with a refluxed condenser, and concentrated sulfuric acid (4.0 grams) was added. The solution was then refluxed for five (5) hours, thereafter cooled to room temperature, and the sulfuric acid neutralized with a dilute solution of sodium bicarbonate. The solution was then washed with distilled water until the water washings were neutral to pH paper. The solvent was then removed by vacuum evaporation and the residue was distilled in a "Hickman" molecular still to yield cuts of the cyclic trimer, tetramer and pentamer. The total yield of distillables was 88 percent of theoretical based on starting material.

Since the "Hickman" still was relatively small, the distillation was divided into parts. One such distillation gave trimer, tetramer and pentamer in the following amounts, the structures of which were confirmed by infrared analysis:

| | Percent |
|---|---|
| Trimer | 31.3 |
| Tetramer | 53.2 |
| Pentamer | 5.2 |
| Total | [1] 89.7 |

[1] Distillable.

The following refractive indices and boiling points were obtained for the materials and the analytical data for the tetramer and pentamer compared favorably with those given in Example I:

GAMMA-CARBETHOXYPROPYLMETHYLSILOXANE CYCLICS

| | 25° C., $n_D$ | B.P.,° C. (50 microns Hg) |
|---|---|---|
| Trimer [1] | 1.4452–58 | 215 |
| Tetramer | 1.4462–8 | 240–280 |
| Pentamer | 1.4497 | 300–340 |

[1] Molecular weight: Calculated, 522. Found, 543.

PREPARATION OF CARBOALKOXYALKYLALKYL-SILOXANE CYCLICS FROM ACID CHLORIDE OF CARBOXYALKYLALKYLPOLYSILOXANE

EXAMPLE IV

*Preparation of Gamma-Carbethoxypropylmethylsiloxane Cyclic Trimer, Tetramer, and Acid Chloride of Gamma-Carboxypropylmethylsiloxane Cyclic Tetramer*

Gamma-carboxypropylmethylsiloxane cyclic tetramer prepared by basic hydrolysis of gamma-cyanopropylmethylsiloxane cyclic tetramer according to the process of our copending application Serial No. 615,468 (cf. Example V), in amount 30 grams, was placed in a one-liter flask fitted with a reflux condenser, together with 100 cubic centimeters of toluene and 24.5 grams (0.206 mole–300% excess) of thionyl chloride. The mixture was heated on a steam bath for four hours. The solvent and excess thionyl chloride were then stripped off under vacuum. The residue material was a free-flowing oil. Infrared analysis of the material indicated that no OH groups were present and a shift in the carbonyl band which was expected for the cyclic aid chloride. A subsequent repeat experiment yielded ninety-five percent (95%) of the theoretical. Elemental analysis of the compound gave the following results:

| | Percent | | | | Saponification Number |
|---|---|---|---|---|---|
| | C | H | Si | Cl | |
| Calculated | 36.5 | 5.5 | 17.0 | 21.6 | 682 |
| Found | 35.9 | 5.9 | 17.0 | 21.7 | 698 |

The cyclic acid chloride as prepared above, in amount 30 grams, was refluxed with absolute ethanol (11.59 grams) for two hours within a one-liter flask fitted with a reflux condenser. The excess ethanol was then removed by vacuum evaporation, and the product distilled through a "Hickman" molecular still. A fraction (10.6 grams) was collected between 200 and 300° C. at 200 microns pressure which had a refractive index ($n_D^{25° C.}$) of 1.4461 which compares favorably with that obtained for the tetramer in Example III. The original material was found to contain both the trimer and tetramer, but was particularly rich in the tetramer. The ultimate yield of tetramer amounted to 33.4% of theoretical. The total yield of distillables was 58.2% of theoretical, consisting essentially of cyclics of gamma-carbethoxypropylmethylsiloxane.

PREPARATION OF CARBOXYALKYLALKYLSILOXANE CYCLICS BY ALKALINE HYDROLYSIS OF CYANOALKYLALKYLSILOXANE CYCLICS

EXAMPLE V

*Preparation of Gamma-Carboxypropylmethylsiloxane Cyclic Tetramer by Alkaline Hydrolysis of Gamma-Cyanopropylmethylsiloxane Cyclic Tetramer*

Gamma-cyanopropylmethylsiloxane cyclic tetramer (348 grams) was dissolved in 300 cubic centimeters of absolute alcohol within a two-liter, round-bottomed flask fitted with a reflux condenser. Sodium hydroxide (1250 cubic centimeters of a 4% solution in water) was then added, and the mixture refluxed for 68 hours. The ethanol and 100 cubic centimeters of water were then distilled off. The cool water solution was extracted with diethylether to remove any non-hydrolyzed material. The water solution was then acidified with hydrochloric acid (10%) and extracted with ether. This ether solution was then washed with distilled water until it was almost neutral. The ether solution was then dried over anhydrous calcium sulfate for twenty (20) hours. The solution was then filtered, and the ether removed by vacuum evaporation. The structure of the desired tetramer was confirmed by infrared analysis. The material had an acid titer equivalent of 159.7 as compared with the theoretical of 146. The yield represented 84.7% of theoretical.

PREPARATION OF CARBOXYALKYLALKYLSILOXANE CYCLICS BY SAPONIFICATION AND NEUTRALIZATION OF CARBOALKOXYALKYLALKYLSILOXANE CYCLICS

EXAMPLE VI

*Preparation of Gamma-Carboxypropylmethylsiloxane Cyclic Tetramer by Saponification and Neutralization of Gamma-Carbethoxypropylmethylsiloxane Cyclic Tetramer*

Gamma-carbethoxypropylmethylsiloxane cyclic tetramer, in amount 348 grams, was dissolved in 300 cubic centimeters of ethanol within a two-liter flask, and 88 grams of sodium hydroxide dissolved in 800 cubic centimeters of water was added thereto. The solution was refluxed for 24 hours, and the alcohol then removed by vacuum evaporation. The remaining aqueous solution was acidified with acetone-hydrogen chloride mixture (25 parts HCl–74 parts acetone), the product extracted with ethyl ether, and the ether solution washed with water until nearly neutral. The ether was evaporated on a steam bath and the product taken up in 200 cubic centimeters of toluene which was in turn evaporated under reduced pressure to give a viscous material which had a neutralization equivalent of 146 (theoretical=146). The structure of the desired carboxy-tetramer was otherwise confirmed for the material.

UTILITY REACTIONS

EXAMPLE VII

*Preparation of Bis (Trimethylsiloxy)-Gamma-Carboxypropylmethylsilane and Bis (Trimethylsiloxy)-Bis (Gamma-Carboxypropylmethyl) Disiloxane by Equilibration of Gamma-Carboxypropylmethylsiloxane Cyclic Tetramer With Hexamethyldisiloxane in the Presence of Sulfuric Acid Catalyst.*

Hexamethyldisiloxane, in amount 50 grams, and gamma-carboxypropylmethylsiloxane cyclic tetramer were admixed within a 500 cubic centimeter round-bottomed flask fitted with a stirrer. The mixture was then heated to 80° C., on a steam bath. Sulfuric acid catalyst (1.5 grams) was then added with stirring, and the mixture was equilibrated at 80° C. for three hours with stirring. The solution was then diluted with distilled water and extracted with diethyl ether. The ether solution was washed free of sulfuric acid, and the ether then evaporated off. The siloxane was then dissolved in dilute sodium hydroxide (10%) to form the sodium salt. The basic solution was extracted with diethyl ether to remove any unreacted hexamethyldisiloxane, and the ether layer was discarded. The water solution was then dropped slowly into a solution of 10% hydrochloric acid and dioxane to give the free acid. The solution was then extracted with diethyl ether and the ether solution washed free of hydrochloric acid. The ether and water were then stripped off under vacuum, yielding an oil which was soluble in $(Me_2SiO)_4$.

The oil was distilled through a one-plate column yielding a fraction of boiling point 100–160° C. at 200 micron pressure. The material had a neutralization equivalent of 288 (theoretical for the desired compound is 308). An infrared analysis confirmed its structure to be:

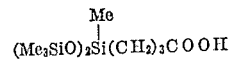

The yield was 26.3% based on gamma-carboxypropylmethylsiloxane cyclic tetramer. The residue weighed 12.05 grams, and infrared analysis of the same confirmed its structure to be:

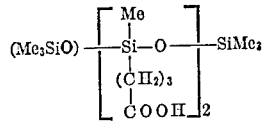

The resulting low molecular weight siloxane, trimethylsiloxy end-blocked, and containing one and two carboxypropylmethylsiloxy groups per molecule, are extremely useful products for the production of polyester resins, and as components for the production of silicone oils containing carboxyalkylsiloxy groups.

EXAMPLE VIII

*Preparation of Dimethylsilicone Oil Containing Five Percent by Weight of Gamma-Carbethoxypropylmethylsiloxy Units*

Octamethylcyclotetrasiloxane, in amount 87.3 grams, dodecamethylpentasiloxane, in amount 7.7 grams, and gamma-carbethoxypropylmethylsiloxane cyclic tetramer, in amount 5.0 grams, were admixed within a 500 cubic centimeter, three-necked, round-bottomed flask fitted with reflux condenser, thermometer and stirrer. The mixture was heated to 60–95° C. on a steam bath and one percent by weight sulfuric acid was added with stirring. The heating and stirring were continued for about three hours. The sulfuric acid was then neutralized with sodium bicarbonate. The silicone was dissolved in diisopropyl ether and washed with distilled water until neutral to pH paper. The ether and any water remaining were removed by vacuum evaporation at 150° C. Infrared analysis of the oil showed absorption in the region expected for a dimethylsilicone oil containing gamma-carbethoxypropylmethylsiloxy units. The viscosity of the oil was 79 centistokes at 25° C.

This application is a continuation of copending application Serial No. 615,499, filed October 12, 1956.

What is claimed is:

1. A polysiloxane selected from the group consisting of cyclic polysiloxanes represented by the formula:

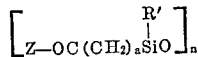

wherein Z is a member selected from the group consisting of alkali metal-oxy radicals (MO—) from alkali metal hydroxides, chlorine and aryloxy radicals; R' is a member selected from the group consisting of alkyl and aryl radicals; $a$ is an integer of from 3 to 10 inclusive; and $n$ is an integer of from 3 to 5 inclusive.

2. An acid chloride of a carboxypolymethylenealkylsiloxane cyclic trimer of the formula:

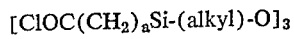

wherein $a$ is an integer from 3 to 10 inclusive.

3. An acid chloride of a carboxypolymethylenealkylsiloxane cyclic tetramer of the formula:

$$[ClOC(CH_2)_aSi\text{-}(alkyl)\text{-}O]_4$$

wherein $a$ is an integer from 3 to 10 inclusive.

4. An acid chloride of a carboxypolymethylene alkylsiloxane cyclic pentamer of the formula:

$$[ClOC(CH_2)_aSi\text{-}(alkyl)\text{-}O]_5$$

wherein $a$ is an integer from 3 to 10 inclusive.

5. The acid chloride of gamma-carboxypropylmethylsiloxane cyclic tetramer.

6. The sodium salt of a carboxypolymethylenealkylsiloxane cyclic tetramer said sodium salt having the formula $$[NaOOC(CH_2)_aSi(Alkyl)\text{-}O]_4$$

wherein $a$ is an integer of from 3 to 10 inclusive.

7. A process for the production of acid chloride alkylcyclic siloxanes of the formula $$\left[ ClOC(CH_2)_a\underset{\underset{R'}{|}}{Si}\text{—}O \right]_n$$

wherein R' is a member selected from the group consisting of alkyl and aryl radicals; $a$ is an integer of from 3 to 10 inclusive and n is an integer of from 3 to 5 inclusive which comprises forming an admixture of carboxyalkylcyclicpolysiloxane of the formula $$\left[ HOOC(CH_2)_a\underset{\underset{R'}{|}}{Si}O \right]_n$$

wherein R', $a$ and $n$ are as above-defined with an inorganic acid chloride and maintaining said mixture at temperature at which said carboxyalkylcyclicpolysiloxane and said inorganic acid chloride react to produce said acid chloride alkylcyclic siloxanes.

References Cited in the file of this patent

UNITED STATES PATENTS

| | | | |
|---|---|---|---|
| 2,610,199 | Sommer | Sept. 9, | 1952 |
| 2,723,987 | Speier | Nov. 15, | 1955 |
| 2,855,381 | Sommer | Oct. 7, | 1958 |